United States Patent
Jobi et al.

(10) Patent No.: US 10,613,917 B2
(45) Date of Patent: *Apr. 7, 2020

(54) CONTAINERIZED APPLICATION SYSTEM GRAPH DRIVER

(71) Applicant: Portworx, Inc., Los Altos, CA (US)

(72) Inventors: Joseph Jobi, Santa Clara, CA (US); Goutham Rao, Los Altos, CA (US)

(73) Assignee: Portworx, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,438

(22) Filed: Mar. 15, 2019

(65) Prior Publication Data

US 2019/0272204 A1 Sep. 5, 2019

Related U.S. Application Data

(63) Continuation of application No. 15/488,298, filed on Apr. 14, 2017, now Pat. No. 10,235,222.

(60) Provisional application No. 62/445,623, filed on Jan. 12, 2017, provisional application No. 62/442,795, filed on Jan. 5, 2017.

(51) Int. Cl.
*G06F 9/54* (2006.01)
*G06F 9/455* (2018.01)
*G06F 9/50* (2006.01)

(52) U.S. Cl.
CPC ............ *G06F 9/545* (2013.01); *G06F 9/455* (2013.01); *G06F 9/5016* (2013.01)

(58) Field of Classification Search
None
See application file for complete search history.

(56) References Cited

U.S. PATENT DOCUMENTS

| 9,355,248 B1* | 5/2016 | Wiest | G06F 21/55 |
| 2017/0054759 A1* | 2/2017 | Lee | H04L 63/20 |
| 2018/0287883 A1* | 10/2018 | Joshi | G06F 9/455 |

* cited by examiner

*Primary Examiner* — Craig C Dorais
(74) *Attorney, Agent, or Firm* — Kwan & Olynick LLP

(57) ABSTRACT

A custom file system in a containerized software architecture facilitates the instantiation of application containers. Each container is composed of one or more application image layers. An application container instance includes read-only application image layer data shared among application container instances associated with the same application container. An application container instance may also include read/write application container instance data that is specific to the application container instance.

20 Claims, 7 Drawing Sheets

CONTAINERIZED APPLICATION SYSTEM GRAPH DRIVER

CROSS-REFERENCE TO RELATED APPLICATIONS

This application is a continuation of U.S. patent application Ser. No. 15/488,298 titled "Containerized Application System Graph Driver" and filed on Apr. 14, 2017 by Joseph Jobi and Vinod Jayaraman, and claims priority to Provisional U.S. Patent Application No. 62/442,795, titled "Containerized Application System Graph Driver" and filed on Jan. 5, 2017 by Joseph Jobi and Vinod Jayaraman, and claims priority to Provisional U.S. Patent Application No. 62/445,623, titled "Implementation of a Graph Driver" and filed on Jan. 12, 2017 by Joseph Jobi and Vinod Jayaraman, all of which are hereby incorporated herein by reference in their entirety and for all purposes.

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
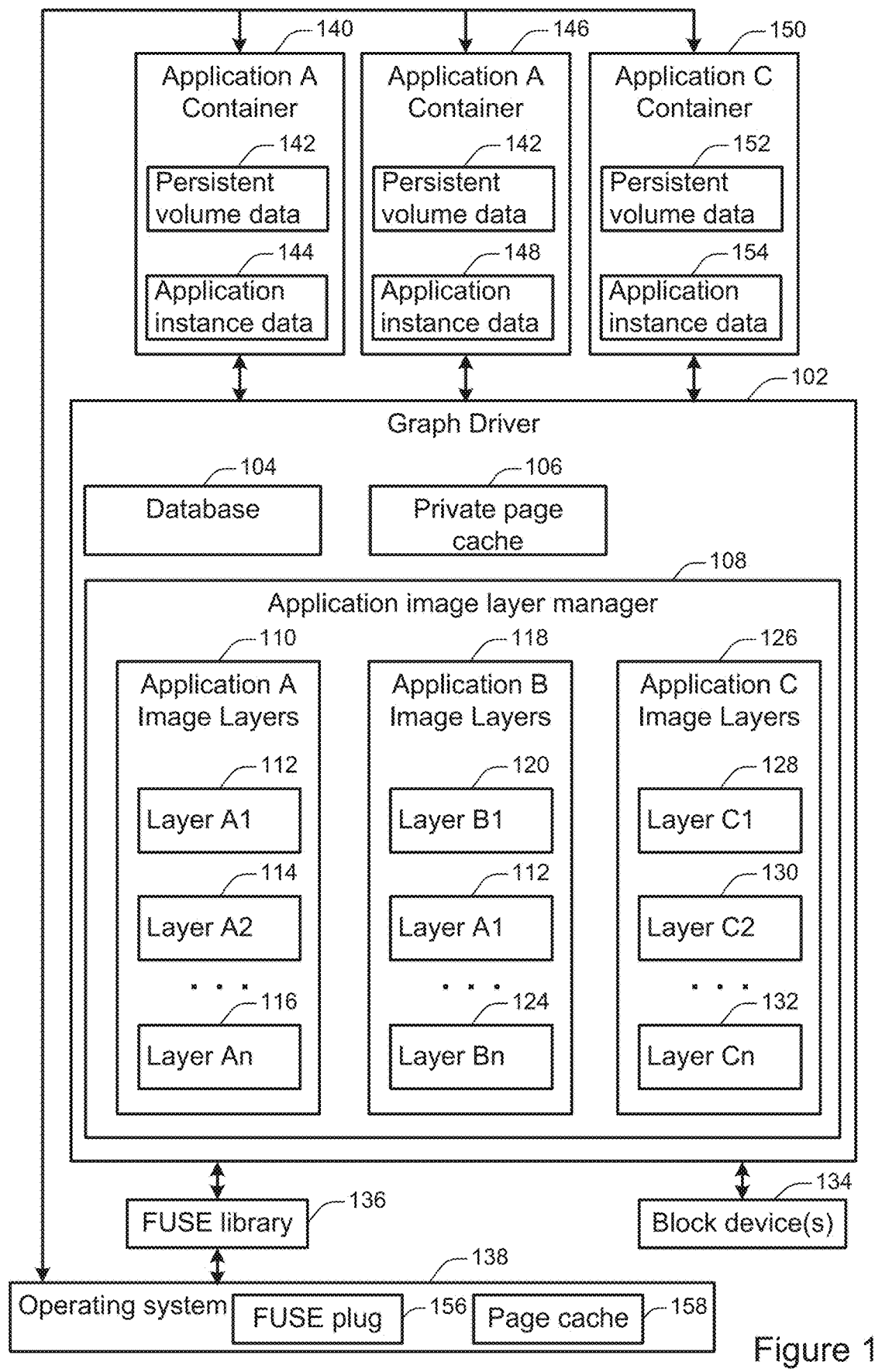
FIG. 1 illustrates an example of an arrangement of components in a containerized storage system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

OVERVIEW

Techniques and mechanisms described herein provide for a custom file system in a containerized application system. A containerized application system is one in which an application instance may be created as a container based on an application image, which itself may be composed of some number of application image layers. Moreover, as will be discussed in greater detail below, such application instances may be instantiated in parallel and based on shared data such that application containers may be created, deleted, and accessed independently of one another and based on the same shared data.

EXAMPLE EMBODIMENTS

Conventional containerized application systems employ a conventional file system to implement a graph driver. The unit of granularity in most conventional file systems is a single system call. For example, conventional file systems perform operations such as fsync, journaling, and checkpointing to ensure consistency between the data stored on disk and the data index.

According to techniques and mechanisms described herein, in some implementations, an application aware graph driver can download image layers with a much larger level of granularity. For instance, an application aware graph driver can retrieve an image layer via a network and write the layer to disk. However, if the download process fails prior to the image layer being written to disk, the graph driver can simply re-download the entire image. In this way, the application aware graph driver can avoid performing costly operations such as fsync, journaling, and checkpointing. Accordingly, techniques and mechanisms described herein provide for more efficient operation and expanded capabilities of the computer itself.

Containerized application compute nodes that operate different types of application containers over a period of time may face binding storage constraints. For example, a compute node may operate over 100 days and, during that time, might instantiate application containers for 1,000 different applications. If the graph driver is allocated 100 GB for storage, then the graph driver might exceed the available memory during that time unless images are deleted.

In conventional containerized application systems, instantiation of numerous instances of an application may result in inefficient implementations of lengthy chains of snapshots of applications, or cumbersome implementations of inode proliferation. As will be discussed in greater detail below, such containerized application systems may inefficiently utilize memory and other computing resources, or may incur processing and storage requirements that might not be feasible in a scalable manner.

According to techniques and mechanisms described herein, a graph driver may be implemented to store and maintain application image layers associated with applications. Furthermore, instances of application containers may be created on top of those application image layers, and provided read-only access to those application image layers. Such instances of application containers may be implemented in parallel and independent of each other. Furthermore, a database and a private page cache may be implemented to store data related to application image layers and/or application instance data. Accordingly, various embodiments disclosed herein do not utilize lengthy snapshot chains or cumbersome inode proliferation, and provide increased efficiency and efficacy of the implementation of instances of application containers.

According to techniques and mechanisms described herein, the term "graph driver" may refer to a native file system implemented in direct communication with one or more block devices such as conventional disk-based hard drives or solid state drives. By directly connecting an application-aware file system with block devices, many different file-system operations can be made more efficient. Thus, a graph driver as described herein differs from many conventional techniques in containerized storage systems which involve a custom file system layered on top of a conventional file system (e.g., Advanced Multi-Layered Unification Filesystem ("AUFS") which is often implemented on top of the ext4 file system, Overlay File System ("OverlayFS") which is often implemented on top of the XFS file system, devicemapper which is often implemented on top of a Logical Volume Manager ("LVM"), B-tree file system ("Btrfs") which is often implemented on top of an LVM, and other such approaches). In particular, a graph driver as described herein is more efficient than merged file systems or device-mapper based systems.

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

An application container is frequently constructed as a series of two or more layers. Each layer may include some number of files. For instance, an application container may include an operating system such as a Linux distribution as a base layer. Then, the application container may include additional layers, such as a MySQL layer and an Nginx layer, that each rely on the files included in the base layer.

Organizing files into layers may facilitate the separation of an application container into more granular components. In some embodiments, a layer may take the form of a tar archive, also known as a tarball. Alternately, a layer may take the form of any other file aggregation mechanism, such as a zip file or a folder of files. Thus, a container may be modified by replacing a single layer with a new version, without having to distribute a new copy of the entire container.

When an application container is loaded into memory for execution, the layers may need to be combined in some way in order to function together. For example, files from a MySQL layer may be combined in memory with files from a base operating system layer to create a functioning whole.

The software that unifies layers into a functioning whole may be referred to as an image layer storage driver.

When employing conventional techniques, conflicts may arise if different layers include different versions of the same file. For example, an upper layer may either include a different version of the same file in a lower layer prior to being loaded into memory. As another example, an upper layer may write to a file in a lower layer after the layers have all been loaded into memory for execution. Conventional techniques to merging layers into a unified whole and addressing these potential conflicts include two approaches.

The first conventional technique is referred to as an overlay approach. Examples of union file systems are OverlayFS and UnionFS. A union file system combines the different layers to present a virtualized namespace. A union file system employs a copy-on-write technique. When an upper layer writes to a file that already exists in a lower layer, the image layer storage driver creates a new copy of the file. The file in the lower layer is not modified directly because other layers may reference the same file.

Union file systems may exhibit several drawbacks, which may include, but are not limited to: inode proliferation, incorrect file semantics (e.g., locking), memory consumption, and reloading the same file from disk more than once. Several specific examples of drawbacks are described below. First, union file systems incur a performance penalty and a disk usage penalty by copying an entire file from a lower layer when an upper layer writes to that file, even if the data that is written is a small portion of the overall file size.

Second, union file systems create problems with Inotify. Inotify (inode notify) is a Linux kernel subsystem that acts to extend filesystems to notice changes to the filesystem, and report those changes to applications. If writing to a file creates a new copy of that file, then the creation or editing of the new version of the file does not trigger a notification under Inotify, which may create a loss of functionality that breaks some applications.

Third, union file systems create inode proliferation. In a non-containerized application, two applications writing to the same file will access the file via the same inode. In this way, data written to the file by one application can be read from the file by the other application. However, the union file system approach of copying the file upon a write to the file generates a new inode for the copy. Therefore, if the base layer subsequently writes to the copy of the file, the upper layer that has copied the file will not be accessing the file with the same inode as the lower layer and thus will not be able to read the changes written by the base layer. Inode proliferation also means that a file may not be locked for the purpose of serializing reads and writes of the file and preventing conflicts or race conditions between different applications.

A second conventional technique for constructing an image layer storage driver is a snapshot approach. Under a snapshot approach, the image layer storage driver creates a block-wise snapshot for each subsequent layer. Each file stored in a storage system is composed of some number of data blocks. A snapshot of an upper layer may include only data blocks associated with files that the upper layer has added or data blocks associated with changes that the upper layer has made to files in the lower layer. The snapshot of the base layer may thus include all of the data in the base layer, while the snapshot of the upper layer may include a relatively limited amount of data that makes up the additions and changes provided by the upper layer. The image layer storage driver may load the upper layer into memory by first loading the snapshot associated with the base layer and then loading on top the snapshot associated with the upper layer.

Snapshot file systems typically provide relatively efficient usage of disk space but may exhibit several drawbacks. For example, snapshot file systems may exhibit inefficient usage of memory. If a container includes two different upper level layers, then a snapshot file system may load a complete snapshot of the base layer for each of the upper level layers. For example, the base layer of a container may include an operating system, a snapshot of which may require 10 gb to represent in memory. If the container includes two upper level layers that are associated with different snapshots that each require 1 gb to represent in memory, then loading both upper level layers into memory would require 11 gb (10 gb for the base layer and 1 gb for the upper layer) for a total of 22 gb of memory usage. In addition to being an inefficient usage of memory due to loading the base layer twice, the snapshot file system approach requires reading the base layer twice from disk, thus also incurring a performance penalty in loading the layers.

In conventional file systems, each I/O access is typically atomic at the system call level to support failure recovery. However, such approaches impose significant computing overhead in terms of system disk I/O operations and resources devoted to operations such as journaling. According to various embodiments, techniques and mechanisms described herein provide for improved file system data I/O. By providing an image-aware file system as a graph driver, changes to the file system that involve adding or modifying an image layer may be made in memory and committed to disk only when the layer is persisted as opposed to after every operation. Such techniques may provide for more efficient image building and downloading, less system disk I/O, and fewer computing resources consumed, thus improving the performance of the computer itself. Such techniques may also help to avoid storing blocks of zeroes on disk or in memory.

In conventional file system, all data is typically treated as read/write. However, according to techniques and mechanisms described herein, application image layer data is treated as read-only, which simplifies the process for creating and destroying application containers. For example, all clones of an application can share the same base layer data, which avoids the computing costs associated with copying the base layer data. As another example, layers can be deleted in reverse order such that the newest layer is always deleted first, which provides for faster tear down of containers and avoids the need to roll back snapshots. As another example, layers are thin provisioned and instantiate new copies of data, which helps to keep layers independent as much as possible so that running containers do not interfere with one another. In this way, new containers can be created/started and existing containers can be stopped/deleted without pausing any running containers.

In conventional file systems, committing a new version of an existing container requires finding all changes made in the container compared to the base image layer, creating an archive that includes those changes, and then extracting those changes from the archive to another layer that then sits on top of the base layer. In contrast, techniques and mechanisms described herein provides for improved efficiency by swapping layers internally without moving data or traversing a namespace to identify changes between layers.

FIG. 1 illustrates an arrangement of components in a containerized application system implemented on a computing device. According to various embodiments, a containerized application system may serve as an intermediating layer between containerized applications and the computing device, allowing the same containerized application to run on different types of computing devices. For example, a containerized application system may be installed on top of different types of hardware computing devices and/or within different types of software operating systems. However, each containerized application may be written in such a way that it includes some or all of the resources (e.g., software libraries, software executables, etc.) necessary to run the application, regardless of the underlying architecture.

At 102, a graph driver is shown. According to various embodiments, the graph driver may act as a file system configured to support the storage and execution of containerized applications. In particular embodiments, the graph driver may be run in the user-space of the underlying operating system rather than in another part of the operating system such as the kernel-space.

According to some embodiments, graph driver 102 may include application image layer manager 108 which may be configured to store and maintain image layers associated with various applications that may be implemented in a containerized environment. Examples of containerized applications may include, but are not limited to: a privileged storage container application, a MySQL application, an Apache web server application, a file server application, a container configured for instantiation in the Docker containerized application environment, or any other suitable application. For example, a first application, such as application "A", may have an associated application image that is stored within application image layer manager 108. As shown in FIG. 1, such an application image may be stored as several layers in a stack, such as that shown by layer A1 112, layer A2 114, and layer An 116 of application A image layers 110. Similarly, for another application, such as application "B", another application image may be stored as application B image layers 118 that include layers such as layer B1 120, layer A1 112, and layer Bn 124. Furthermore, yet another application, such as application "C", may have another application image that is stored as application C image layers 126 that include layers such as layer C1 128, layer C2 130, and layer Cn 132. While FIG. 1 illustrates image layers associated with three applications, any number of applications may be implemented, and each application may have anywhere from one to many image layers.

In some embodiments, application image layers may include computer software instructions necessary for instantiation a containerized application. Each layer may supplement and/or modify any or all lower layers, and the layers may be combined to provide the instructions for generating the complete application. For example, if Application A were a MySQL application, then Layer A1 112 may include one or more basic software libraries for database operations, while Layer A2 114 may include application logic for implementing the MySQL application. Application A may also include any number of additional application layers. Layer An 116 may include one or more patches or other portions of computer software instructions that modify instructions in lower layers. By combining these different layers, the MySQL application may be instantiated. Many different types and configurations of applications are possible.

In particular embodiments, the same application image layer may be included in different applications. For instance, the application image layer A1 112 is included in both the Application A 110 and the application B 118. An example of such a configuration may be an image layer associated with a commonly used software program such as the Apache web server, which may be included as a layer in different applications that rely on such a web server. When the same image layer is included in different applications, the image layer need only be stored once because the graph driver 102 can provide read-only access to the same image layer for the instantiation of different applications.

At 104, a database is shown. In some implementations, the database 104 may be used to record information about application layers accessible to the graph driver 102. For instance, in the example shown in FIG. 1, the database may store information about Application A image layers 110, Application B image layers 118, and Application C image layers 126. The database may store various types of information about a given application and/or application image layer. For instance, for a given application image layer the database may store a name, a checksum, date or time information about when the application image layer was stored or created, an application identifier, or any other relevant information. A checksum may provide a hash value or other aggregate identifier for the content of the image layer. For instance, the checksum may include the result of applying an MD5, SHA-1, or other type of hash function to all or part of the image layer.

An operating system, such as operating system 138, may be coupled with graph driver 102 and application containers 140, 146, and 150. In various embodiments, operating system 138 may be configured to manage hardware and software resources within system 100, as well as provide common services for various applications implemented within system 100. In various embodiments, operating system 138 may include FUSE plug 156 and page cache 158. FUSE plug 156 may be configured to provide an interface between FUSE library 136 and operating system 138. Accordingly, FUSE plug 156 may facilitate the implementation of a Filesystem in Userspace (FUSE). FUSE may provide an infrastructure for non-privileged users in an operating system to run a file system without editing operating system kernel code. Within this infrastructure, the FUSE library 136 may provide a bridge from the file system to the operating system interfaces.

In some embodiments, the FUSE plug 156 may provide a standard interface for performing file system operations. For instance, an application may transmit an instruction to the FUSE plug 156 to retrieve a file from disk, store a file to disk, read a directory, create a directory, or perform any other such operation. The instruction may be transmitted in such a way that it is independent of the actual file system that implements the instruction. The operating system 138 may transmit the instruction to the graph driver 102 via the FUSE library 136, which may translate the instruction for interpretation by the graph driver 102. In this way, the graph driver 102 and the operating system 138 may operating independently. For instance, the same graph driver 102 may be used in conjunction with different operating systems.

The containerized application system may further include one or more block devices, such as block device 134. According to various embodiments, a block device may include one or more components for storing data. For example, a block device may include a spinning hard disk drive, a solid state drive, a network drive, an optical drive, or any other such component. The graph driver 102 may have access to a single block device or may have access to more block devices, depending on factors such as the hardware capabilities of the underlying system and the configuration parameters of the graph driver 102, the operating system 138, or other system components. In some implementations, a block device may be used to store data associated with the graph driver. For instance, a block device may be used to store application image layer data, database records, and/or private page cache data.

According to various embodiments, the graph driver 102 may be configured to store and manage application images associated with application containers. Application containers may be instantiated and implemented based on shared application images. The application image layers may be stored as read-only, and may be used as the basis of instantiating application containers. For example, application containers, such as application A container 140, application A container 146, and application C container 150 may be instantiated based on their respective application image layers which may be application A image layers 110 and application C image layers 126. In this example, the underlying image layers may be stored and shared in application image layer manager 108, and each application container may store application instance data used to instantiate a particular instance of an application.

In some implementations, more than one instance of a single application container may be created. For instance, in FIG. 1, Application A Container A 140 and Application A Container A 146 are both instances of Application A. In particular embodiments, one, two, several, or various numbers of instances of a single application container may be created. For instance, different instances of a containerized MySQL application may be created for use in storing database records for different applications.

In some implementations, instantiating an Application Container instance may involve providing the instance with a way of accessing read-only application files associated with the application. For instance, image layer data associated with an application may provide read-only computer programming language instructions and other data that is used to create a new instance of that application. Although different instances of an application may be created, this application image layer data may remain the same. Thus, two different instances of application A may be implemented and executed based on the same shared application data included in application A image layers 110. In this way, potentially any number of instances of application containers may be implemented for a particular application, and all of the instances may refer back to the same shared application image layers.

In FIG. 1, Application A Container 140 includes persistent volume data 142, Application A Container 146 includes persistent volume data 142, and Application C Container 146 includes persistent volume data 152. This persistent volume data corresponds with the Application Image Layer data for those applications. Because Application A Container 140 and Application Container A 146 correspond to the same application and because the image layer data is stored as "read-only", these two application instances share the same persistent volume data 142, which corresponds to the Application A Image Layers 110.

In some implementations, instantiating an application container may involve providing an application instance with a way of storing and retrieving application data specific to the application instance. Configurations and changes of such instances may be saved in the application instance data as snapshots of the application containers and their associated underlying application image layers. In FIG. 1, Application A Container 140 includes application instance data 144, Application A Container 146 includes application instance data 148, and Application C Container 146 includes application instance data 154.

Techniques and mechanisms described herein may be implemented using image specific snapshotting techniques that are configured for page cache consumption, image snap creation time and inode count. In some implementations, the graph driver creates layers for images and read-write layers on top of those for containers. Each image will have a base layer, in which files of the image are populated initially. Additional layers may be created on top of the base layer and for each additional layer in the image being extracted. Each layer shares data from the previous layer. If a layer modifies any data, that data is visible from the layers on top of that layer, but not from the layers below that layer. Also if a container modifies data in an image it is loaded from, that modified data is not visible from any other derived layers on top of that image layer.

According to various embodiments, a layer in an image is a read-only snapshot sitting on top of the previous layer in the image. Therefore, these derived layers share common data between each other. A layer is immutable after its contents are completely populated. When any existing data inherited from a previous layer is modified while populating data to a new layer, a branch-on-write (BOW) operation is performed, for instance in increments of 4 KB blocks. New data can be written to a newly allocated location on the back-end block storage device, and old data will no longer be accessible from the layer (or any other layer created on top of that subsequently) which modified the data. Similarly, any files deleted from a layer are not visible from that layer or on any of the layers on top of that layer.

According to various embodiments, when a read-write layer is created while starting a new container (two such layers for every container), a read-write snapshot is created on top of the image layer and mounted from the container. The container can see all the data from the image layers below the read-write layer and can create new data or modify any existing data as needed. When any existing data is modified, the data is not modified in the image layer. Instead a private copy with new data is made available for the read-write layer.

In some embodiments, instance-specific data may include application data specific to the runtime of the application. For instance, different instances of a MySQL application container may include different data stored in the different MySQL databases. As another example, instance-specific data may include modifications to the underlying files. For example, a containerized MySQL application may modify a configuration file associated with that application. The modified data may be stored in the application instance data. This application instance data may supersede the read-only persistent volume data associated with the application. In this way, different instances of a containerized application may be unique at run-time even though they rely on the same underlying read-only image layer data.

In various embodiments, application images may be managed such that application containers are implemented as parallel snapshots of the underlying application image layers. Accordingly, the application containers may be implemented at a same hierarchical level, and not layered. For instance, Application A Container instance 140 and Application A Container instance 146 may be created as parallel and equivalent instances of the same application A rather than in a hierarchical or dependent relationship, with one of the container instances dependent or descended from the other.

The operating system 138 includes a page cache 158, and the graph driver 102 includes a private page cache 106. According to various embodiments, a page cache is a record of where data is stored on a storage device such as one of the block devices 134. The page cache 158 may be used to provide page cache services to the operating system 158. For instance, the page cache 158 may record the storage location of operating system files and/or user data associated with the operating system.

In particular embodiments, the private page cache 106 may be used to record storage information for data specific to the graph driver 102. For instance, the private page cache 106 may be used to store data related to application image layers and/or application instance data. Because the graph driver 102 has access to a private page cache, the graph driver can provide efficient storage and access to data. For example, if an application container creates instance data that modifies or supersedes image layer data, then the difference between the modified and modified data can be stored as a limited number of data blocks rather than storing an entirely new copy of the entire image layer data. As another example, by managing a private page cache, the graph driver 102 can provide multiple instances of an application with access to the same data blocks for the read-only application image layer data associated with the application container. Thus, the persistent volume data for an application container can serve as a thin layer referencing this shared data rather than a separate copy of the data.

Figure 2:
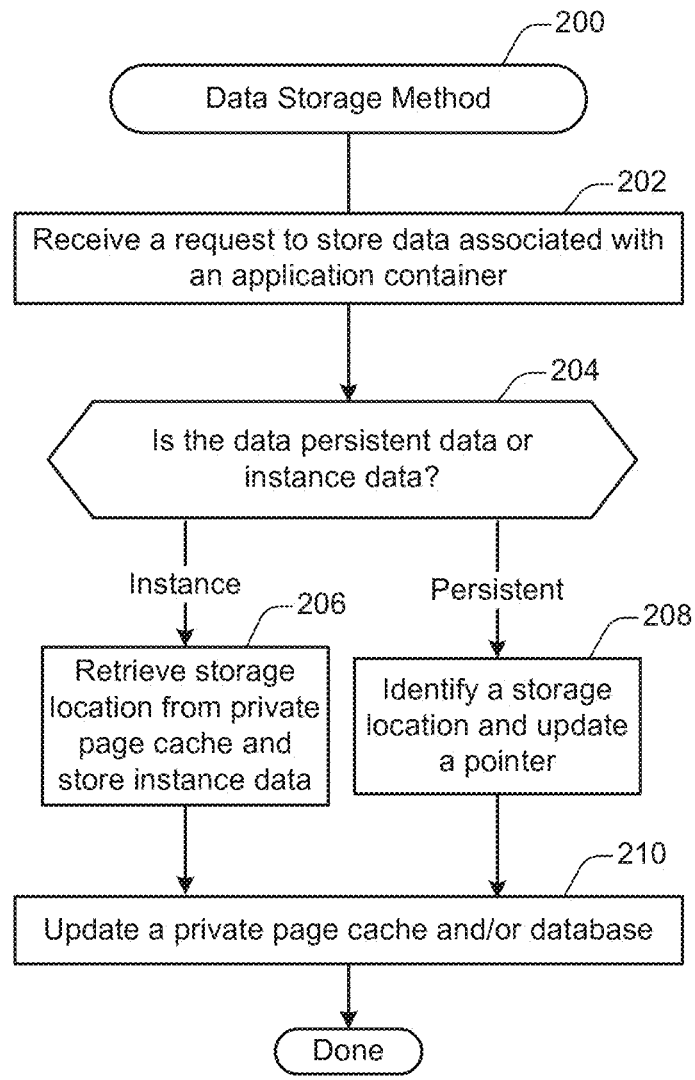
FIG. 2 illustrates an example of a method for implementing data storage operations.

FIG. 2 illustrates an example of a method for implementing data storage operations. In various embodiments, a method, such as method 200, may be implemented to access, store, and/or modify data in an application container. As discussed above, such an application container may be configured as a storage container. Accordingly, method 200 may be implemented to facilitate data storage and transfers between a computing device and data stored in the application container.

Method 200 may commence with operation 202 during which a request to store data in an application container may be received. As similarly discussed above, such a request may be received at a storage container node that includes a graph driver as well as an instantiation of the application container. Such a request may be received from another node or client machine. As also discussed above, such a request may include one or more application container identifiers that may be used to identify a specific node, and a specific application container within that node. In various embodiments, the request to store data may be part of updating a data block of a file stored in the storage container.

Method 200 may proceed to operation 204 during which it may be determined if the data block associated with the request is persistent data or instance data. In various embodiments, such a determination may be made based on the contents of the private page cached. For example, the data block associated with the request may be looked up in the private page cache, and the private page cache may identify, based on a flag or other identifier, if the data block and associated file exists in the system and is stored as either persistent data or instance data. If it is determined that the data block is associated with instance data, method 200 may proceed to operation 206.

Accordingly, during operation 206, a storage location may be retrieved from the private page cache and application instance data may be accessed and/or modified as appropriate. As discussed above, the application storage container may have read and write access to instance data. Accordingly, if the request received at operation 202 is associated with application instance data, and if the request has been sent to update a data block of a file included in the application instance data, the storage location of the data block may be looked up in the private page cache, and the new contents of the data block may be written to the storage location.

Returning to operation 204, if it is determined that the data block is associated with persistent data, method 200 may proceed to operation 208, during which a storage location may be identified, and a pointer within the private page cache may be updated. As discussed above, the request received at operation 202 may have been sent to update a data block of a file. However, in this example, such a file may be included in persistent volume data which is shared data and read-only. Accordingly, during operation 208, a new storage location may be identified, and the new data associated with the request may be written to that storage location. Moreover, the private page cache may be updated to include a pointer to that new storage location. In this way, updates and changes to read-only persistent data may be stored and maintained by a graph driver and its private page cache.

Method 200 may proceed to operation 210 during which the private page cache and/or database may be updated. As similarly discussed above, the private page cache and/or database may be updated to accurately reflect the changes made to data blocks and files. More specifically, the private page cache and/or database may be updated to reflect any modifications to storage locations that were made, or any pointers that were created.

Figure 3:
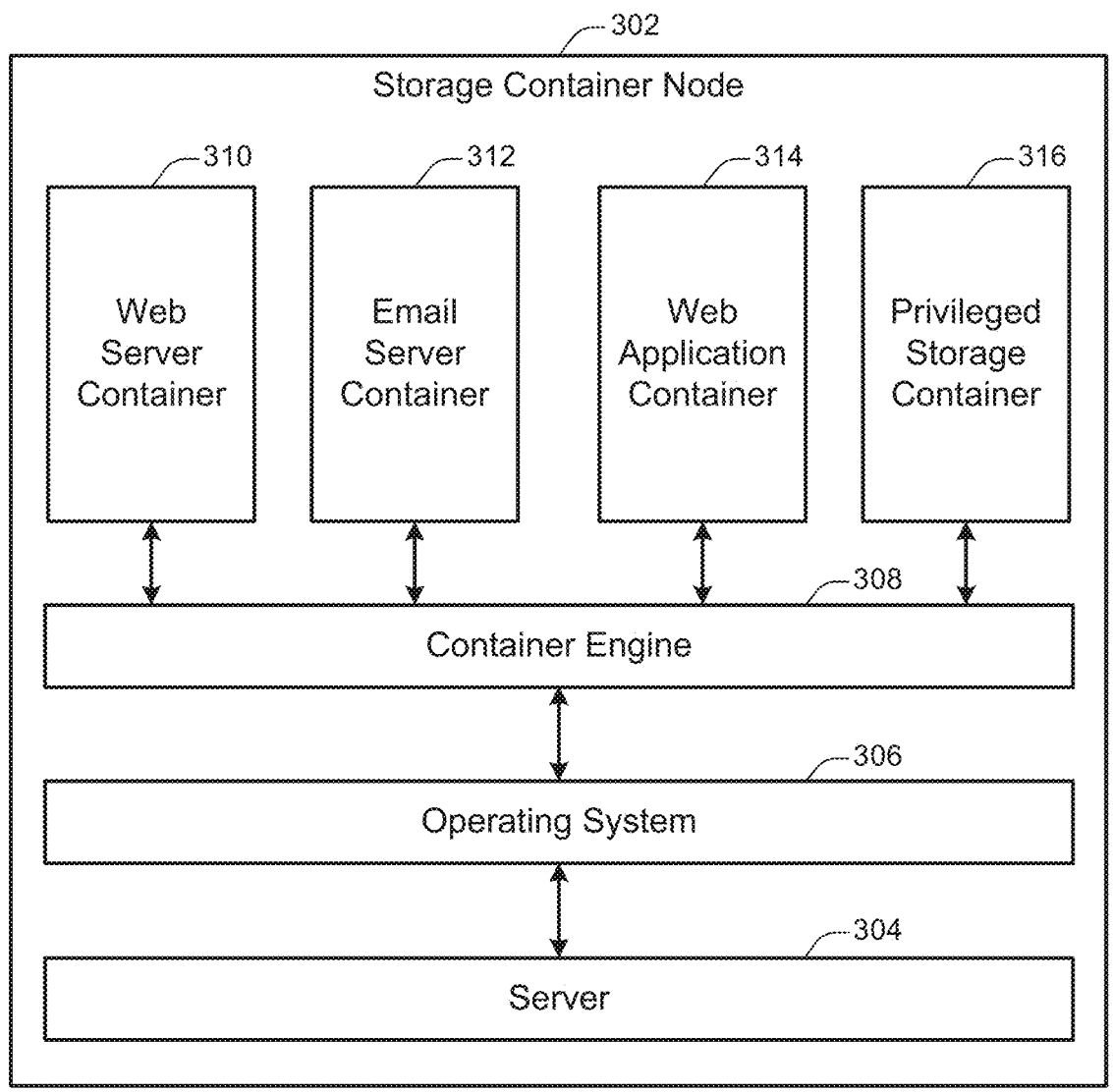
FIG. 3 illustrates an example of a storage container node, configured in accordance with one or more embodiments.

FIG. 3 illustrates an example of a storage container node 302. According to various embodiments, a storage container node may be a server configured to include a container engine and a privileged storage container. The storage container node 302 shown in FIG. 3 includes a server layer 304, an operating system layer 306, a container engine 308, a web server container 310, an email server container 312, a web application container 314, and a privileged storage container 316.

In some embodiments, the storage container node 302 may serve as an interface between storage resources available at a server instance and one or more virtual storage volumes that span more than one physical and/or virtual server. For example, the storage container node 302 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 304, the server layer is shown. According to various embodiments, the server layer may function as an interface by which the operating system 306 interacts with the server on which the storage container node 302 is implemented. A storage container node may be implemented on a virtual or physical server. For example, the storage container node 302 may be implemented at least in part on the server shown in FIG. 5. The server may include hardware such as networking components, memory, physical storage devices, and other such infrastructure. The operating system layer 306 may communicate with these devices through a standardized interface provided by the server layer 304.

At 306, the operating system layer is shown. According to various embodiments, different computing environments may employ different operating system layers. For instance, a physical or virtual server environment may include an operating system based on Microsoft Windows, Linux, or Apple's OS X. The operating system layer 306 may provide, among other functionality, a standardized interface for communicating with the server layer 304.

At 308, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 304, an operating system layer 306, and a container engine layer 308 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 302 includes the web server container 220, the email server container 312, and the web application container 314. A software container may include customized computer code configured to perform any of various tasks. For instance, the web server container 220 may provide files such as webpages to client machines upon request. The email server 312 may handle the receipt and transmission of emails as well as requests by client devices to access those emails. The web application container 314 may be configured to execute any type of web application, such as an instant messaging service, an online auction, a wiki, or a webmail service. Although that storage container node 302 shown in FIG. 3 includes three software containers, other storage container nodes may include various numbers and types of software containers.

At 316, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 312, and 314 or other software containers located in different computing environments. For example, a software container may transmit a storage request to the container engine 308 via a standardized interface. The container engine 308 may transmit the storage request to the privileged storage container 316. The privileged storage container 316 may then communicate with privileged storage containers located on other storage container nodes and/or may communicate with hardware resources located at the storage container node 302 to execute the request.

In some implementations, one or more software containers may be afforded limited permissions in the computing environment in which they are located. For example, in order to facilitate a containerized software environment, the software containers 310, 312, and 314 may be restricted to communicating directly only with the container engine 308 via a standardized interface. The container engine 308 may then be responsible for relaying communications as necessary to other software containers and/or the operating system layer 306.

In some implementations, the privileged storage container 316 may be afforded additional privileges beyond those afforded to ordinary software containers. For example, the privileged storage container 316 may be allowed to communicate directly with the operating system layer 306, the server layer 304, and/or one or more physical hardware components such as physical storage devices. Providing the storage container 316 with expanded privileges may facilitate efficient storage operations such as storing, retrieving, and indexing data.

Figure 4:
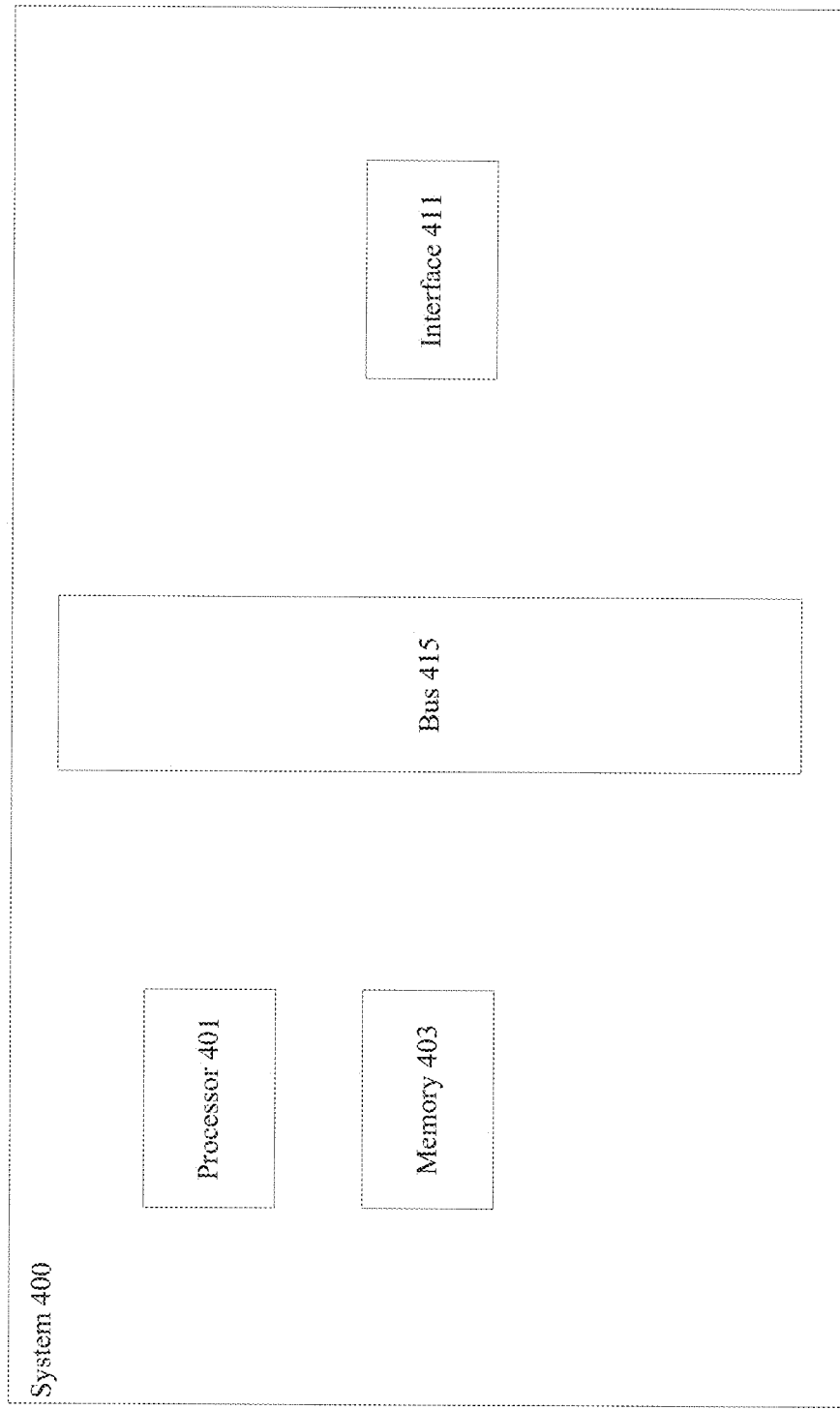
FIG. 4 illustrates an example of a server.

FIG. 4 illustrates one example of a server. According to particular embodiments, a system 400 suitable for implementing particular embodiments of the present invention includes a processor 401, a memory 403, an interface 411, and a bus 415 (e.g., a PCI bus or other interconnection fabric) and operates as a streaming server. When acting under the control of appropriate software or firmware, the processor 401 is responsible for modifying and transmitting live media data to a client. Various specially configured devices can also be used in place of a processor 401 or in addition to processor 401. The interface 411 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 400 is a server configured to run a container engine. For example, the system 400 may be configured as a storage container node as shown in FIG. 1. The server may include one or more hardware elements as shown in FIG. 4. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 5:
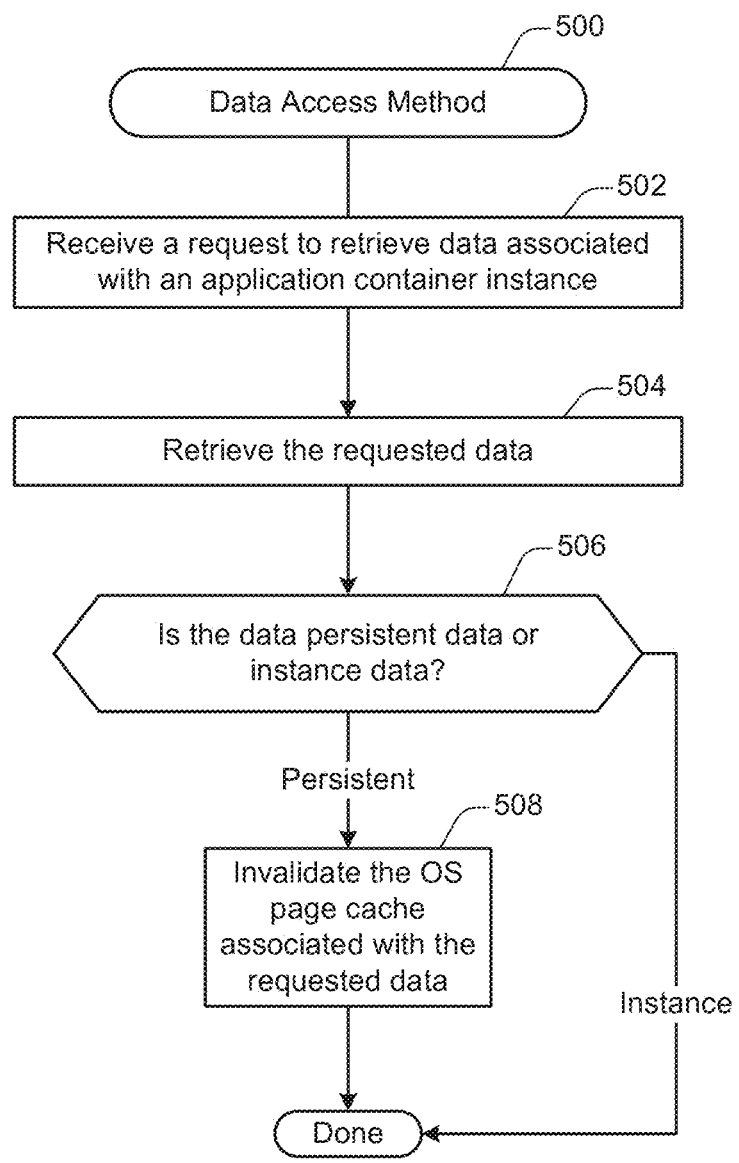
FIG. 5 illustrates an example of a method for providing data access.

FIG. 5 illustrates an example of a method 500 for accessing data associated with an application storage container. According to various embodiments, the method 500 may be employed to retrieve data associated with a container instance such as the container instances 140, 146, and 150 shown in FIG. 1. For instance, the method 500 may be employed when the container instance 140 accesses either the persistent volume data 142 or the application instance data 144.

At 502, a request to retrieve data associated with an application container is received. According to various embodiments, the request may be received as part of the execution of the application container instance. For instance, if the container instance is an email server, then the activation of a particular function or operation associated with the execution of the email server may trigger a request to access computing programming language code or configuration options associated with the email server.

At 504, the requested data is retrieved. In particular embodiments, the requested data may be retrieved by the graph driver 102. For instance, the processor responsible for executing the application container instance may transmit a data access request to the graph driver 102 through the operating system 138, which may transmit the request to the graph driver via the FUSE plug 156 and the FUSE library 136. The graph driver 102 may then access the appropriate block device 134 as necessary to retrieve the application data.

In some instances, data may be retrieved from the operating system page cache 158 or the graph driver private page cache 106. These page caches may store data (e.g., recently accessed data) in memory to avoid costly repeated access to the same data on a block device 134. For instance, the operating system may first check the page cache 158 to determine if the requested data is present. If not, then the operating system may request the data from the graph driver 102. The graph driver 102 may then check the private page cache 106 to determine if the data is present. If not, then the graph driver may retrieve the data from the block device 134.

At 506, a determination is made as to whether the data being accessed is persistent data or instance data. According to various embodiments, persistent data is read-only data associated with a particular application image layer, while instance data is read/write data associated with a particular application container instance. For example, persistent data may include computer programming code associated with the execution of each instance of an email server, while instance data may include specific emails received by a specific instance of the email server.

At 508, if the requested data is persistent, the graph driver will transmit instructions to the operating system to invalidate the operating system page cache associated with the requested data. In conventional operating systems, the operating system will often automatically cache retrieved data in the operating system page cache. However, the graph driver may provide read-only access to the same persistent data from different container instances. Because these requests are associated with different container instances, multiple requests may result in multiple copies of the same data being added to the operating system page cache. To avoid this situation, the graph driver may invalidate the entries in the operating system page cache 106 associated with the requested data. Instead, the graph driver may maintain a private page cache 106. In this way, the graph driver may provide the benefits of maintaining a page cache (e.g., reduced block device I/O and increased data access speed) while avoiding the drawbacks associated with duplicative entries in the OS page cache.

Figure 6:
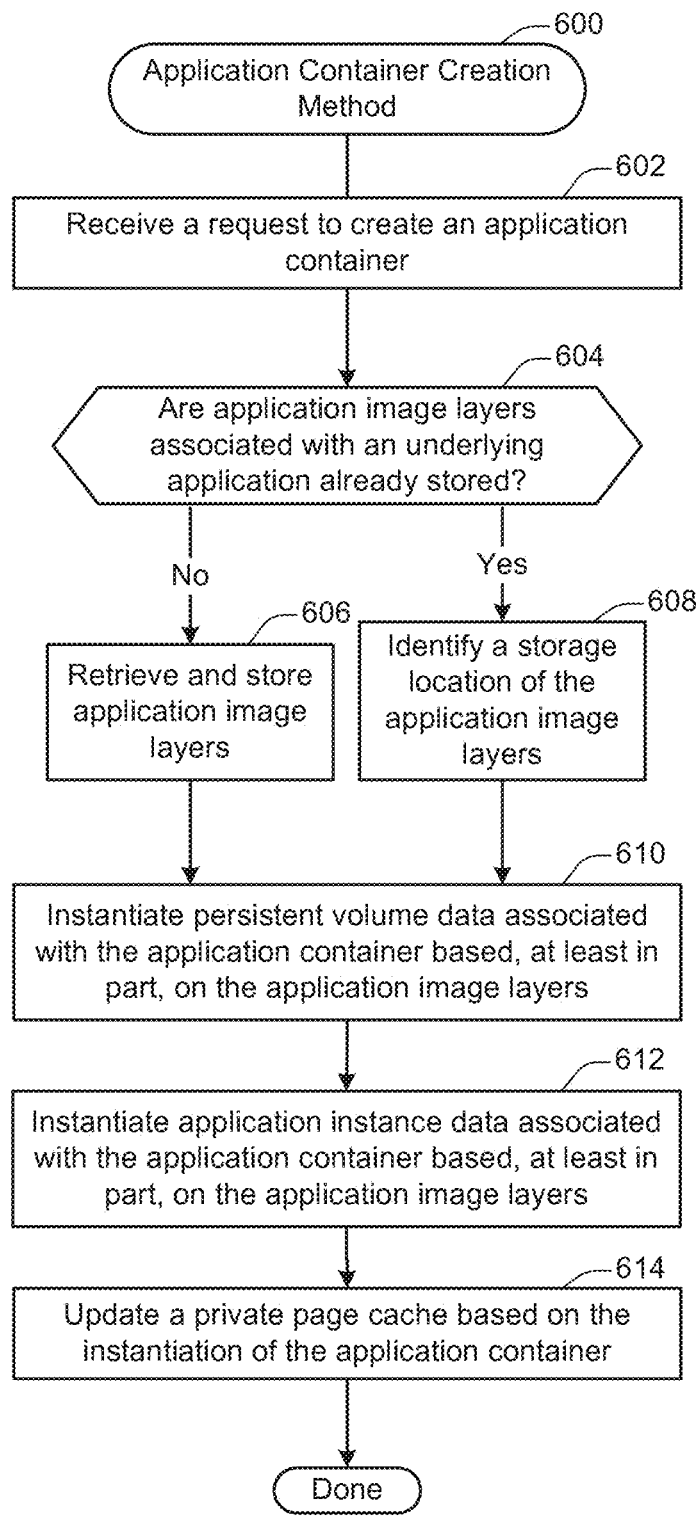
FIG. 6 illustrates an example of a method for creating application containers.

FIG. 6 an example of a method for creating application containers. As similarly discussed above, the creation of application containers may include instantiating application containers such that they are provided with a way of accessing read-only application files associated with the underlying applications. As will be discussed in greater detail below, such instantiation of the application containers may be implemented such that any number of instances of an application may be implemented in parallel and from the same underlying shared data.

Method 600 may commence with operation 602 during which a request to create an application container may be received. As discussed above, application containers may be configured to implement applications such as a privileged storage container application, a MySQL application, an Apache web server application, a file server application, a container configured for instantiation in the Docker containerized application environment, or any other suitable application. In various embodiments, such a request may be received at a storage container node that includes a graph driver, as discussed above. Moreover, such a request may be received from another node or client machine. In various embodiments, such a request may include one or more application identifiers as well as various initial configuration parameters characterizing a specific configuration of the application.

Method 600 may proceed to operation 604 during which it may be determined if application image layers for an application associated with the request are stored in the application image layer manager. In various embodiments, such a determination may be made based on information stored in a database included in the graph driver, such as database 104 discussed above. Accordingly, a database included in the graph driver may store and maintain various data related to applications implemented within the graph driver, and more specifically, related to application image layers stored within an application image layer manager. In various embodiments, the previously described application identifiers may be checked against the contents of the database to determine if a matching application is found. If such a match is found, method 600 may proceed to operation 606. If no such match is found, method 600 may proceed to operation 608.

Accordingly, if it is determined that application image layers are not stored in the application image layer manager, method 600 may proceed to operation 606 during which application image layers may be retrieved and stored within the application image layer manager. In various embodiments, such application image layers may be retrieved from application data stored elsewhere, such as at another storage container node, or a central repository that may be coupled with several storage container nodes, as may be the case in a clustered system. For example, the application image layers may be retrieved from an application image registry, as discussed above. Accordingly, during operation 606, the graph driver may query other storage nodes and/or a central repository to identify the appropriate application image layers associated with the requested application, may retrieve and store application image layers within the application image layer manager, and may update the database accordingly.

Returning to operation 604, if it is determined that application image layers are stored in the application image layer manager, method 600 may proceed to operation 608 during which a storage location of application image layers may be identified. Accordingly, the storage location of the application image layers within the application image layer manager may be identified and subsequently used to instantiate an instance of the application, as will be discussed in greater detail below with reference to operation 610.

Accordingly, method 600 may proceed to operation 610 during which persistent volume data may be instantiated for the application container. As discussed above, application image layers may be stored and maintained by an application image layer manager. In various embodiments, an application container may be generated based on such application image layers. Accordingly, the application container may be instantiated such that the application container is provided with read access to the shared application image layers maintained by the application image layer manager. In various embodiments, the persistent volume data may be configured and implemented as a thin layer including pointers to the application image layers, which are read-only layers from the perspective of the application container and are shared amongst all instances of the underlying application.

Method 600 may proceed to operation 612 during which application instance data may be instantiated for the application container. As previously discussed, the application instance data may store data specific to the instance of the application represented by the application container. Such data may be configuration data as well as other data that may be modifiable by the application container. As similarly discussed above, such instance data may be modification data associated with underlying files (which may be read-only) as well as configuration data specific to runtime of the application. In this way, the application container might not be able to modify or make changes to the application image layers, but may be able to make and store application changes within the application instance data.

Method 600 may proceed to operation 614 during which a private page cache may be updated. Accordingly, the private page cache may be updated to accurately reflect the new instantiation of the application container. As discussed above, such management of the private page cache may provide multiple instances of an application with access to the same data blocks for the read-only application image layer data associated with the application container.

Figure 7:
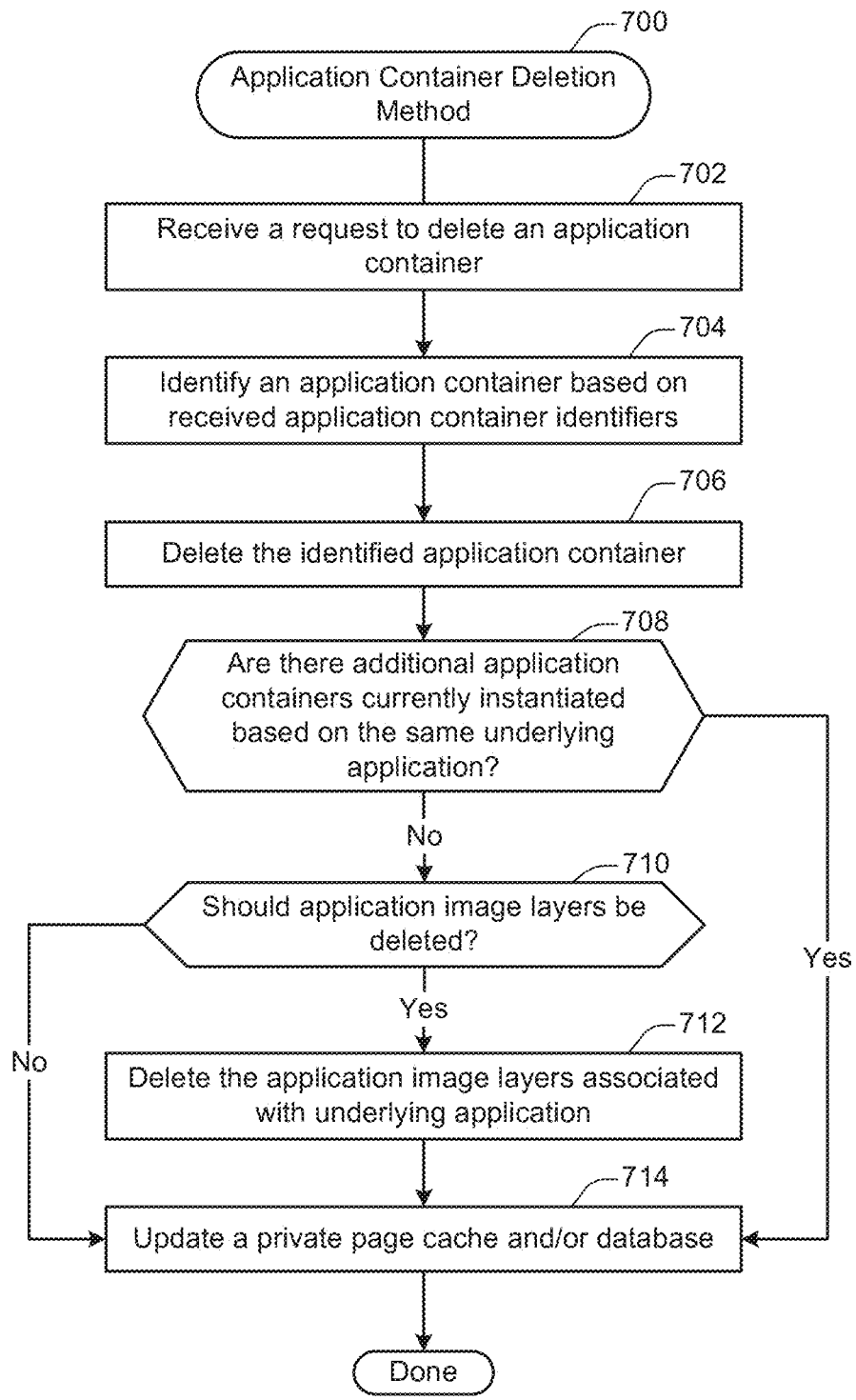
FIG. 7 illustrates an example of a method for deleting application containers.

FIG. 7 illustrates an example of a method for deleting containerized applications. Accordingly, in addition to the creation of application containers, as discussed above, a graph driver may be implemented such that it may also delete or remove application containers. As will be discussed in greater detail below, such deletion of application containers may be implemented such that specific instances of application containers may be deleted and removed without effecting the implementation of other instances of the same application, or the underlying application image layers.

Method 700 may commence with operation 702 during which a request to delete an application container may be received. As similarly discussed above, such a request may be received at a storage container node that includes the graph driver. Moreover, such a request may be received from another node or client machine. In various embodiments, such a request may include one or more application container identifiers that may be used to identify a specific instance of an application represented by a specific application container.

Method 700 may proceed to operation 704 during which an application container may be identified based on the received application container identifiers. Accordingly, a component, such as a graph driver, may analyze the received request, identify a particular application container associated with the request, and may further identify a particular application and application image layers underlying the instantiation of the application container.

Method 700 may proceed to operation 706 during which the identified application container may be deleted. Accordingly, application container, as well as data included in the application container may be removed from storage. Such data may include the persistent volume data as well as the application instance data. In various embodiments, the deletion of the application container does not affect the underlying application image layers which may be retained, as discussed in greater detail below. Accordingly, other instantiations of the application that may be represented as other application containers are not affected by the deletion of the identified application container, and may continue utilizing the underlying shared data maintained by the application image layer manager.

In various embodiments, method 700 may proceed to operation 708 during which it may be determined if any other application containers are currently instantiated based on the previously identified application image layers. Such a determination may be made based on a query of the database and/or private page cache. If it is determined that there are other application containers utilizing the application image layers, method 700 may retain the application image layers, and may proceed to operation 714 discussed below.

If it is determined that there are no other application containers utilizing the application image layers, method 700 may proceed to operation 710 during which it may be determined if the application image layers should be deleted. In various embodiments, such a determination may be made based on one or more inputs or parameters. For example, such image layers may be deleted responsive to identifying that no other instances of applications are using the underlying application image layers. In another example, such image layers may be deleted responsive to a request from an entity, such as a storage container node or other system component. Any suitable condition or parameter may be implemented to facilitate this determination. Accordingly, if it is determined that the application image layers should be deleted, method 700 may proceed to operation 712 during which the identified application image layers may be deleted from a component, such as an application image layer manager of a graph driver. In various embodiments, operations 708, 710, and 712 are performed optionally, and method 700 may be implemented such that the application image layers are retained regardless of whether or not any other application containers are currently instantiated based on the previously identified application image layers.

Method 700 may proceed to operation 714 during which the private page cache and/or database may be updated. Accordingly, the private page cache and/or database may be updated to accurately reflect the changes made to the application containers and application image layers. More specifically, the private page cache and/or database may be updated to reflect any deletions that were made, such as the deletion of the identified application container, as well as any associated application image layers if deletion was determined to be appropriate.

Additional features of the graph driver are discussed in greater detail below. In various embodiments, a graph driver is provided for a containerized software system such as Docker and designed to provide a purpose-built container image management file system. An example of such a purpose-built container image management file system is the Layer Cloning File System ("LCFS") provided by Portworx Inc. of Los Altos, Calif., which is capable of saving, starting, and managing Linux container images and may be accessed by a containerized software such as Docker through the FUSE API. In various embodiments, techniques and mechanisms described herein provide any or all of various advantages relative to conventional approaches.

In conventional systems, file systems in containerized software systems often abuse the page cache by loading multiple copies of the same image layers in memory, taking away host memory from running applications. In contrast, techniques and mechanisms described herein avoid creating multiple copies of the same image layers in memory.

In conventional systems, file systems in containerized software systems often exhaust the number of inodes available, thereby causing the underlying filesystems to run out of space. In contrast, techniques and mechanisms described herein avoid inode proliferation by providing read-only access to the same image data and not creating multiple copies of the data when multiple container instances access the same image data.

In conventional systems, file systems in containerized software systems implement a copy-on-write approach, which consumes CPU and takes time during container image management operations. In contrast, techniques and mechanisms described herein store new copies of data only when that data actually differs between different instances.

In conventional systems, file systems in containerized software systems often end up with orphaned layers and cause the operator to resort to resetting the entire containerized software system, usually by deleting all associated data. In contrast, techniques and mechanisms described herein provide for efficient management of application image layers, allowing layers to be deleted when no longer referenced by any application.

In various embodiments, a graph driver may be implemented as a user-level file system written in a language such as C and integrated into operating systems such as Linux and MacOS via a low-level API such as Fuse. Therefore, in some implementations a graph driver may be implemented without requiring any kernel modifications, providing for a portable and/or POSIX-compliant file system.

In particular embodiments, a graph driver may be configured to store ephemeral or temporary data such as application image layer data that may be easily downloaded again from a central repository. Accordingly, a graph driver may be implemented without some of the complexities of a general-purpose file system, such as journaling. Conventional file systems are typically optimized towards persistent data, provide ACID properties (Atomicity, Consistency, Isolation, Durability) for system calls and attempt to work well with random read-write workloads. In contrast, techniques and mechanisms described herein provide for file systems written with container image handling as a specific workload. These operations and efficiency considerations may include, but are not limited to: container image creation, container image cloning and launching of instances, container image memory consumption, number of inodes reported to the kernel by way of multiple copies of the same image (or layers) running, and container image data management (e.g., actions like deletion, forced image removal and local system resource usage based on multiple container images being present).

Other file systems need to provide ACID properties for every system call. However, according to various embodiments described herein, ACID properties may only be needed when a layer is created, deleted, or persisted. The graph driver hosts the container database with information about various images and containers. It ensures that the database is consistent with the images and therefore that the image data can be read correctly regardless of restarts or crashes. This design in turn avoids having to externally monitor or garbage inspect the data stored in association with the containerized application system.

According to various embodiments, snapshots may be implemented without using any reference counts and thus support a potentially unlimited number of layers. Further, the time used to create a snapshot may be largely or entire independent of factors such as the size of the file system, the number of block devices, the size of the data set, or the number of layers present in the file system. Snapshots may be deleted in the background and processing time may depend on the amount of data actually created/modified in the snapshot. Thus, creation and deletion of layers can be done virtually instantaneously.

In conventional file systems, creating or removing a layer may conflict with operations related to running containers since snapshots are point-in-time images and snapshots may form a chain. In contrast, techniques and mechanisms disclosed herein provide for the creation of a new layer or the deletion of an existing layer without stopping any in-progress operations and without noticeable impact on other running containers. Because the layers on which new layers are created are read-only after they are populated, a new layer will not conflict with any modification operations in progress on the parent layer. Operations within a layer are independent of the total number of layers present in the file system. Each snapshot may be treated as a sibling of the original layer regardless of the number of snapshots.

According to various embodiments, unlike in conventional file systems, layers in a graph driver as disclosed herein are deleted in the reverse order those are created. The newest layer is deleted first, and then the one created just before it. A layer in the middle of chain or the base layer cannot be deleted when there is a newer layer on top of that layer still around. This simplifies the overall snapshot design by avoiding the complexity involved with deleting a snapshot in the middle/beginning of the chain. For example, each layer can easily track space allocated for storing data created/modified by the layer and any such space can be freed without worrying about some other layer sharing any such data. In addition, layers are not rolled back, which avoids some of the complexities of snapshots in a traditional file system. Moreover, by maintaining layers as immutable objects, there is also no need to determine block level differences between layers.

According to various embodiments, when a new device is formatted as a new graph driver file system, a superblock is placed with some file system specific information at the beginning of the device. This information helps to recognize this device to have a valid file system on it anytime it is mounted again in the future. If a device with no valid superblock is mounted as this file system, it is formatted before mounting. Similarly, each of the layers created in the file system also has a private superblock for locating data which belongs exclusively to that layer. Each layer in the file system has a unique index. This index stays the same for the life time of the layer. In addition to the layers created for storing images and containers, a global file system layer keeps data not part of any layers. Superblocks of layers taken on a top of a common layer are linked together. Superblocks of the common layer point to one of those top layer superblocks. Thus, superblocks of all layers taken on top of a layer can be reached from the superblock of that common bottom layer.

In particular embodiments, available space is tracked using a list of free extents. There will be a single such extent immediately after the file system is formatted. The global file system layer tracks the blocks where this list is stored. Similarly, all other layers keep track of extents allocated to those layers. Those blocks are also reachable from the superblock of those layers. In some embodiments, 4 KB is the smallest unit of space allocation or size of I/O to the device, called file system block size. For files larger than 4 KB, multiple such blocks can be allocated in a single operation. Every layer shares the whole device, and space can be allocated for any layer from anywhere in the underlying device.

In some implementations, each file created in any layer has an inode to track information specific to that file such as stat info, dirty data not flushed to disk, etc. Each inode has a unique identifier in the file system called "inode number." Files deleted in a layer do not have to maintain any whiteouts, as their references from the directories are removed in that layer. Inode numbers are not reused even after a file is deleted.

According to various embodiments, the target name for symbolic links is also stored in the same block where inode is written. For directories, separate blocks are allocated for storing directory entries and those blocks are linked together as chain and the chain is linked from the inode. For regular files, additional blocks are allocated for storing data and linked from the inode. When a file becomes fragmented, such as when an entire file cannot be stored contiguously on disk, then additional blocks can be allocated to track file page offsets and corresponding disk locations where data is stored, in extent format. Such blocks, called "emap blocks," are linked from the inode as well. If the file has extended attributes, those can be stored in additional blocks and linked from the inode as well.

According to various embodiments, file handles may be formed by combining the layer index and the inode number of the file. This is a 64-bit number and is returned to FUSE when files are opened/created. This file handle can be used to locate the same file in subsequent operations like read, readdir, write, truncate, flush, release, etc. The file handle for a shared file, when accessed from different layers, would be different as the layer index part of the file handle would be different. This may be a problem when same file is read from different layers as multiple copies of data may end up in the kernel page cache. To alleviate this problem, pages of a shared file in kernel page cache are invalidated on last close of a shared file or when a file is closed in the operating system.

In various embodiments, each layer has a read-write lock, which is taken in shared mode while reading/writing to the layer (all file operations). This lock is taken in exclusive mode while unmounting the root layer or while deleting any other layer. Moreover, each inode has a read-write lock. Operations which can be run in shared mode (read, readdir, getattr, etc.), take that lock in shared mode, while other operations which modify the inode hold that lock in exclusive mode. This lock is not taken once a layer is frozen (meaning, a new layer is created on top of that layer and no more changes are allowed in the layer).

In some implementations, new layers are added after locking the parent layer in shared mode, if there is a parent layer. The newly created layer can be linked to the parent layer. All the layers taken on a parent layer are linked together as well. A layer with no parent layer forms a base layer. The base layer for any layer can be reached by traversing the parent layers starting from that layer. Layers with same base layer form a "tree of layers". A layer is removed after locking that layer in exclusive mode. That makes sure all operations on that layer are drained. Also shared locks on the base layer are held during that operation. The root layer is locked in shared mode while creating/deleting layers and locked exclusive while unmounting the file system.

According to various embodiments, each layer will allocate space in chunks of a few blocks and then files within that layer will consume space from those chunks. This approach eliminates many of the complexities associated with space management in traditional file systems. The global pool does not have to be locked down for various allocations happening concurrently across various layers in the file system. Another advantage of this approach space allocated in layers is less likely to be fragmented. Every layer keeps track of space allocated within that layer and all that space can be returned to the global pool when the layer is deleted. Unused space in reserved chunks can be returned as well as part of layer deletion, sync, and unmount.

According to various embodiments, writes are returned immediately after copying new data to inode page table. Zero blocks written to files are detected. If all data written to a file is zeros, then nothing is written to disk and such files do not consume any disk space. If pages of a file with non-zero data are overwritten with zeroes, then corresponding blocks are freed from the file. Sparse files are supported and files do not consume space on disk for sparse regions. Writes which are not page aligned do not trigger reading at the time of write, but deferred until application reads the page again or when the page is written to disk. If the page is filled up with subsequent writes, reading of the page from disk can be completely avoided as a whole page can be written down.

According to various embodiments, space for files is not allocated when data is written to the file, but later when dirty data is flushed to disk. Accordingly, the size of the file is known at the time of space allocation and all the blocks needed for the file can be allocated as single extent if the file system is not fragmented. With the read-only layers created while populating images, files are written once and never modified. This scheme of deferred allocation helps keeping the files contiguous on disk. Also temporary files may never get written to disk because they are not persisted. For instance, large temporary files may be created for image tar files. This scheme of deferred allocation also helps to conserve computing resources when an application writes to a file randomly and/or when writes are not page aligned. In addition, when writes received on a file are all zeroes, those zeroes need not be written to disk and therefore need not consume any space on disk. Such a scheme also conserves computing resources when writing out small files by coalescing many of them together and writing their pages to disk in large chunks Similarly, metadata blocks like inode blocks and directory blocks may be placed contiguously and written out together. The attempt to place files contiguously on disk may provide benefits in terms of consuming less memory (e.g., less metadata), less disk space, and less overhead. When space for a file is allocated contiguously as part of flush, the dirty pages of the file can be flushed in large chunks reducing the number of I/Os issued to the device.

If the graph driver is not shutdown normally, the container database and layers in the graph driver need to be consistent, and each layer needs to be consistent as well. According to various embodiments, because the graph driver manages both the container database and the images/container data, those are kept in consistent state by using checkpointing technologies. Thus the file system described herein can avoid the complexity of journaling schemes used in conventional file systems to provide crash consistency.

According to various embodiments, finding differences between any two layers may involve finding inodes present in layers between the old layer and new layer (inclusive). When enabled at build time, file operations and ioctl requests may be counted and times taken for each of those are tracked for each layer separately. Those stats can be queried using a command. In some embodiments, such stats can also displayed at the time a layer is unmounted. Stats for a layer can be cleared before running applications to trace actual operations during any time period. Memory usage on a per layer basis can be tracked and reported as well. Similarly, count of files of different types in every layer is maintained. Also, counts of I/Os issued by each layer can tracked.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
a memory; and
at least one processor configured to:
instantiate a first application container based on a first plurality of application image layers and application instance data, the first application container being a virtualized application, the first application container having read-only access to the first plurality of application image layers; and
instantiate a second application container based, at least in part, on the first plurality of application image layers; and
a private page cache configured to facilitate shared access of both the first application container and the second application container to the first plurality of application image layers.

2. The system of claim 1, further comprising a network interface configured to enable communications over a network.

3. The system of claim 1, wherein the processor is further configured to store the first plurality of application image layers.

4. The system of claim 1, wherein the plurality of application image layers comprises a stack of layers representing an application image.

5. The system of claim 1, wherein the second application container has a different hardware configuration than the first application container.

6. The system of claim 1 further comprising a database configured to store and maintain information associated with the first plurality of application layers.

7. The system of claim 6, wherein the database is configured to store a name, a checksum, time information, and an application identifier for each image layer of the first plurality of application image layers.

8. The system of claim 1, wherein the at least one processor is further configured to store a second plurality of application image layers associated with a second application.

9. The system of claim 8, wherein the at least one processor is further configured to instantiate a third application container based on the second plurality of application image layers.

10. The system of claim 1, wherein the first application container is a privileged storage container application.

11. The system of claim 1, wherein the memory and the at least one processor are included in a storage container node.

12. A method comprising:
instantiating, using at least one processor, a first application container based on a first plurality of application image layers and application instance data, the first application container being a virtualized application, the first application container having read-only access to the first plurality of application image layers;
instantiating a second application container based, at least in part, on the first plurality of application image layers; and
facilitating shared access of both the first application container and the second application container to the first plurality of application image layers via a private page cache.

13. The method of claim 12, further comprising:
identifying the first plurality of application image layers, the first plurality of application image layers being a stack of layers representing an application image.

14. The method of claim 13 further comprising:
identifying a second plurality of application image layers associated with a second application.

15. The method of claim 14 further comprising:
instantiating a third application container based on the second plurality of application image layers.

16. The method of claim 12, wherein the first application container is a privileged storage container application.

17. One or more non-transitory computer readable media having instructions stored thereon for performing a method, the method comprising:
instantiating, using at least one processor, a first application container based on a first plurality of application image layers and application instance data, the first application container being a virtualized application, the first application container having read-only access to the first plurality of application image layers;
instantiating a second application container based, at least in part, on the first plurality of application image layers; and
facilitating shared access of both the first application container and the second application container to the first plurality of application image layers via a private page cache.

18. The one or more non-transitory computer readable media recited in claim 17, wherein the method further comprises:
identifying the first plurality of application image layers, the first plurality of application image layers being a stack of layers representing an application image.

19. The one or more non-transitory computer readable media recited in claim 17, wherein the method further comprises:
identifying a second plurality of application image layers associated with a second application.

20. The one or more non-transitory computer readable media recited in claim 19, wherein the method further comprises:
instantiating a third application container based on the second plurality of application image layers.

* * * * *